United States Patent
Liu et al.

(10) Patent No.: US 11,303,562 B1
(45) Date of Patent: Apr. 12, 2022

(54) DYNAMIC HIGH-AVAILABILITY ARCHITECTURE

(71) Applicant: International Business Machines Corporation, Armonk, NY (US)

(72) Inventors: Guang Ya Liu, Xian (CN); Long Long Cao, Xian (CN); Hui Chen, Xian (CN); Xu Zhao, Xian (CN); Qing Hao, Xian (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/157,183

(22) Filed: Jan. 25, 2021

(51) Int. Cl.
*G06F 13/00* (2006.01)
*H04L 45/28* (2022.01)
*H04L 45/00* (2022.01)
*H04L 43/0882* (2022.01)
*H04L 47/122* (2022.01)
*H04L 45/24* (2022.01)

(52) U.S. Cl.
CPC .......... *H04L 45/28* (2013.01); *H04L 43/0882* (2013.01); *H04L 45/22* (2013.01); *H04L 45/24* (2013.01); *H04L 47/122* (2013.01)

(58) Field of Classification Search
CPC ..... H04L 45/28; H04L 43/0882; H04L 45/22; H04L 45/24; H04L 47/122
USPC ........ 709/220–222, 238–240, 223, 224, 201; 713/400; 714/4.1
See application file for complete search history.

(56) References Cited

U.S. PATENT DOCUMENTS

| | | | |
|---|---|---|---|
| 6,792,472 B1 * | 9/2004 | Otterness | H04L 29/06 709/239 |
| 6,912,669 B2 * | 6/2005 | Hauck | G06F 12/0866 714/6.23 |
| 9,032,133 B2 | 5/2015 | Schmidt | |
| 9,223,606 B1 | 12/2015 | Vaidya | |

(Continued)

OTHER PUBLICATIONS

Mell et al., "The NIST Definition of Cloud Computing", Recommendations of the National Institute of Standards and Technology, Special Publication 800-145, Sep. 2011, 7 pages.

*Primary Examiner* — Kenneth R Coulter
(74) *Attorney, Agent, or Firm* — Christopher M. Pignato

(57) ABSTRACT

Systems, methods and computer program products dynamically configuring architecture of high-availability computing environments to maximize uptime of the high-availability systems and minimizing the down time of the computing environment fulfilling incoming connections, requests and data transfers. Embodiments dynamically configure arbitrary systems of the high availability computing environments, including network nodes, virtual machines, containerized systems, managed clusters thereof, agents, and application components, using a lightweight and portable HA controller plugin. The HA controller plugin installs controller components, data migration logic, synchronizes data and configurations of the computing environment on any nodes promoted to controllers with lead HA controllers elected by system administrators. As existing primary or secondary controllers experience failovers, existing components and nodes of the environment can be quickly promoted to operate as controllers via the controller plugin, ensuring redundant controllers are available to takeover and direct incoming network traffic, while minimizing or eliminating downtime due to controller failover.

20 Claims, 10 Drawing Sheets

(56) References Cited

U.S. PATENT DOCUMENTS

| | | | |
|---|---|---|---|
| 9,405,640 B2 | 8/2016 | Sreenivasan | |
| 9,817,602 B2 * | 11/2017 | Chaw | G06F 3/0611 |
| 9,954,773 B2 * | 4/2018 | Hu | H04L 45/507 |
| 10,552,272 B2 | 2/2020 | Wang | |
| 2003/0158999 A1 * | 8/2003 | Hauck | G06F 12/0866 |
| | | | 711/113 |
| 2015/0124830 A1 * | 5/2015 | Hu | H04L 45/507 |
| | | | 370/392 |
| 2016/0056996 A1 | 2/2016 | Anand | |
| 2016/0139849 A1 * | 5/2016 | Chaw | G06F 3/0656 |
| | | | 711/119 |
| 2018/0013672 A1 * | 1/2018 | Pacella | H04L 41/5054 |

\* cited by examiner

DYNAMIC HIGH-AVAILABILITY ARCHITECTURE

TECHNICAL FIELD

The present disclosure relates generally to the field of computer system architecture and more specifically to system architecture of high-availability computing systems.

BACKGROUND

High-availability computing environments are configured to maintain computing systems at nearly full-time availability. Such computing systems within a high-availability computing environment typically maintain redundant hardware and software components that allow the computing systems to maintain availability despite failures that may periodically occur. Optimal designs for high-availability systems avoid single-points of failure, and any hardware or software component that can fail have a redundant component of the same type in a well-designed high-availability system. When failures occur, the failover process moves processing performed by the failed component, to a backup component. The high-availability system can remaster systemwide resources, recover partial or failed transaction and restore the computer system back to normal following the failure of a component, as quickly as possible, to ensure the failure results in as little downtime as possible.

SUMMARY

Embodiments of the present disclosure relate to a computer-implemented method, an associated computer system, and computer program product for dynamically configuring a high-availability computing environment using a plugin model to install nodes, application components, managed clusters and other arbitrary systems of the high availability computing environment with a high-availability ("HA") controller; the method comprising: designating, by a processor, a first arbitrary system of a computing network as a primary controller and a second arbitrary system of the computing network as a secondary controller; installing, by the processor, on the primary controller and the secondary controller, a plugin comprising the high-availability (HA) controller; routing, by the processor, incoming network traffic from client devices of the computing network through the primary controller; detecting, by the processor, a failure of the primary controller; re-routing, by the processor, the incoming network traffic through the secondary controller; in response to the failure of the primary controller, selecting, by the processor, one or more arbitrary systems of the computing network for promotion to a controller candidate; promoting, by the processor, the one or more arbitrary systems selected to the controller candidate; and installing, by the processor, the plugin comprising the HA controller onto the controller candidate.

Embodiments of the present disclosure further relate to a computer-implemented method, an associated computer system, and computer program product for dynamically configuring a high-availability computing environment using a plugin model to configure controller nodes, the method comprising: installing on a primary controller node and a secondary controller node of a high availability computing environment, a plugin comprising a high-availability (HA) controller; routing incoming network traffic from client devices of a computing network through the primary controller node; detecting a failure of the primary controller node; re-routing the incoming network traffic through the secondary controller node; in response to the failure of the primary controller node, selecting one or more agent nodes of the computing network for promotion to a controller node candidate; promoting the selected agent node to the controller node candidate, and installing, by the processor, the plugin comprising the HA controller onto the controller node candidate.

DETAILED DESCRIPTION

Figure 1:
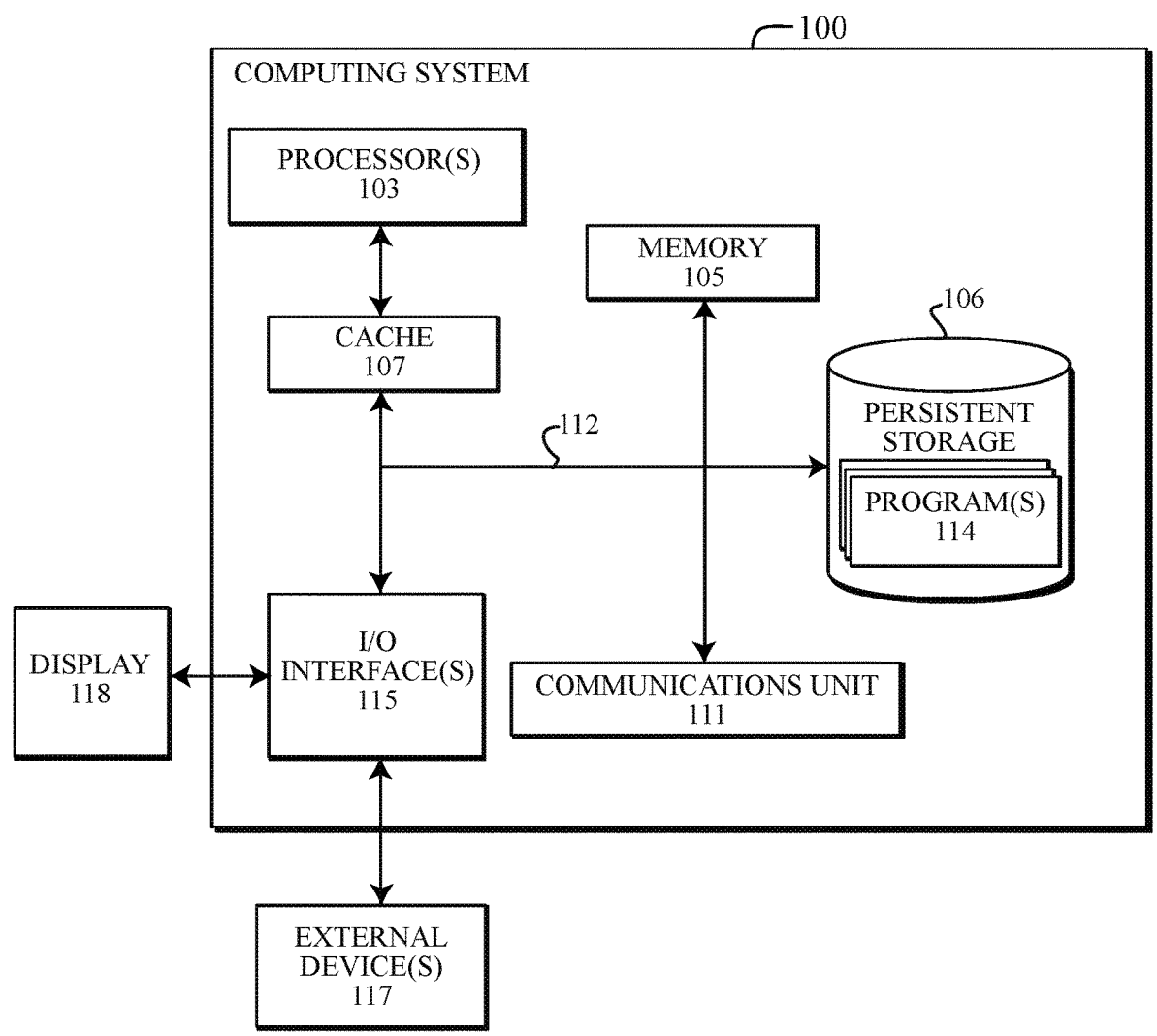
FIG. 1 depicts an embodiment of a block diagram of internal and external components of a computing system in which embodiments described herein may be implemented in accordance with the present disclosure, including within a high-availability computing environment.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description but is not intended to be exhaustive or limited to the disclosure in the form disclosed. Many modifications and variations will be apparent to those of ordinary skill in the art without departing from the scope and spirit of the disclosure. The embodiments described herein are chosen and described in order to best explain the principles of the disclosure and the practical application and to enable others of ordinary skill in the art to understand the disclosure for various embodiments with various modifications as are suited to the particular use contemplated.

Overview

Existing high availability computing environments are typically equipped with at least an active controller for managing incoming requests and at least one backup controller in case the active controller fails. These controllers may also be referred to as a primary controller and a secondary controller. A primary controller might be actively receiving incoming connections and fulfilling the incoming requests of the network traffic, while the secondary controller acts as a backup in case the primary controller fails, is taken offline or removed from the network. Under currently available architectures for high availability computing environment, when the primary controller crashes or fails, administrators of the HA system are required to manually take actions to restore the failed controller of the HA system, or manually provision a replacement controller, in order to ensure that the HA system proceeds to run continuously without interruption.

Embodiments of the present disclosure recognize the shortcomings of existing HA systems, which require administrators to manually restore failed controllers, manually provision new controllers in response to failovers, and manually assign tasks to the backup controller of the HA computing environment. Instead of requiring manual provisioning and task assignments, embodiments of the HA computing environments described herein are capable of dynamically creating new HA controllers for the computing environments, without administrators (or other authorized users) having to manually provision the controllers. An administrator or owner of the HA computing environment may initially elect a lead HA controller. The lead HA controller may, in turn, create new HA controllers from any available arbitrary system within the computing environment by installing a plugin for the HA controller onto the elected arbitrary system within the HA computing environment. The HA plugin model used by the embodiments of the present disclosure, allow for flexibility of use in different types of HA computing environments. For example, the HA computing environment can be a single cluster environment, a multi-cluster environment, a multi-cloud environment, an application environment and/or any type of environment comprising customer resources. Any of the arbitrary systems of the HA environment are eligible to become HA controllers via the plugin installation, and the arbitrary systems may be selected from one or more applications, application components, nodes, agents, hub clusters, managed clusters, etc., of the HA computing environment.

Selection of new HA controllers and installation of HA controller components may be performed by the lead HA controller, in accordance with pre-programmed instructions, learned behaviors, and/or in accordance with one or more policies of the HA computing environment. For example, when the number when of available HA controllers of an HA computing environment falls beneath a threshold level, the policies of the HA computing environment might instruct the lead HA controller to select one or more arbitrary systems of the HA computing environment as a new HA controller candidate. The lead HA controller can instruct the arbitrary system to drain off any existing workload and install the HA controller plugin.

Embodiments of the present disclosure allow for any arbitrary system within the HA computing environment to become HA controllers using a lightweight and portable HA controller plugin module, which can be easily installed onto HA controller candidates by the lead HA controller. Embodiments of the HA controller plugin can be equipped with the programmable logic and controller components, which can be installed on any arbitrary system, including any nodes, containers, clusters, agents, core application components, etc. Arbitrary systems selected as HA controller candidates, install the controller components to become an HA controller, can synchronize the newly created HA controller with the data of the computing environment, and synchronize configurations of the new HA controller with the most recent configurations of existing HA controllers and/or the lead HA controller within the HA computing environment. The introduction of dynamically created HA controllers and controller candidates using a plugin module, improves HA computing systems by ensuring that client resources (including nodes, clusters, applications, etc.) are readily maintained in a stable state, even in computing environments that comprise only a single node in a cluster or a single cluster in a multi-cloud environment.

Computing System

The present invention may be a system, a method, and/or a computer program product at any possible technical detail level of integration. The computer program product may include a computer-readable storage medium (or media) having the computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network, and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine-dependent instructions, microcode, firmware instructions, state-setting data, configuration data for integrated circuitry, or either source code or object code written in any combination of one or more programming languages, including an object-oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer-readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other devices to cause a series of operational steps to be performed on the computer, other programmable apparatus, or other devices to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

FIG. 1 illustrates a block diagram of an embodiment of a computing system 100, which may be a simplified example of a computing device (i.e. a physical bare metal system or virtual system) capable of performing the computing operations described herein. Computing system 100 may be representative of the one or more computing systems or devices implemented as part of computing environment 200, 260, 300, 360, 400, 460 as shown in FIGS. 2A-4B, including high-availability computing systems within high-availability (HA) computing environments 201, 301, 401, in accordance with the embodiments of the present disclosure. It should be appreciated that FIG. 1 provides only an illustration of one implementation of a computing system 100 and does not imply any limitations regarding the environments in which different embodiments may be implemented. In general, the components illustrated in FIG. 1 may be representative of any electronic device, either physical or virtualized, capable of executing machine-readable program instructions.

While FIG. 1 shows one example of a computing system 100. A computing system 100 may take many different forms, including bare metal computer systems, virtualized computer systems, container-oriented architecture, and microservice-oriented architecture. For example, computing system 100 can take the form of real or virtualized systems, including but not limited to desktop computer systems, laptops, notebooks, tablets, servers, client devices, network devices, network terminals, thin clients, thick clients, kiosks, mobile communication devices (e.g., smartphones), multi-processor systems, microprocessor-based systems, mini-computer systems, mainframe computer systems, smart devices, or Internet of Things (IoT) devices. The computing systems 100 can operate in a local computing environment, networked computing environment, a containerized computing environment, and/or a distributed cloud computing environment, which can include any of the systems or devices described herein and/or additional computing devices or systems known or used by a person of ordinary skill in the art.

Computing system 100 may include communications fabric 112, which can provide for electronic communications between one or more processor(s) 103, memory 105, persistent storage 106, cache 107, communications unit 111, and one or more input/output (I/O) interface(s) 115. Communications fabric 112 can be implemented with any architecture designed for passing data and/or controlling information between processor(s) 103 (such as microprocessors, CPUs, and network processors, etc.), memory 105, external devices 117, and any other hardware components within a computing system 100. For example, communications fabric 112 can be implemented as one or more buses, such as an address bus or data bus.

Memory 105 and persistent storage 106 may be computer-readable storage media. Embodiments of memory 105 may include random access memory (RAM) and cache 107 memory. In general, memory 105 can include any suitable volatile or non-volatile computer-readable storage media and may comprise firmware or other software programmed into the memory 105. Program(s) 114, software applications, user processes, and services, including high-availability controllers 211, lead HA controllers 213, and installed components thereof, described herein, may be stored in memory 105 and/or persistent storage 106 for execution and/or access by one or more of the respective processor(s) 103 of the computing system 100.

Persistent storage 106 may include a plurality of magnetic hard disk drives, solid-state hard drives, semiconductor storage devices, read-only memories (ROM), erasable programmable read-only memories (EPROM), flash memories, or any other computer-readable storage media that is capable of storing program instructions or digital information. Embodiments of the media used by persistent storage 106 can also be removable. For example, a removable hard drive can be used for persistent storage 106. Other examples include optical and magnetic disks, thumb drives, and smart cards that are inserted into a drive for transfer onto another computer-readable storage medium that is also part of persistent storage 106.

Communications unit 111 provides for the facilitation of electronic communications between computing systems 100. For example, between one or more computer systems or devices via a communication network 250. In the exemplary embodiment, communications unit 111 may include network adapters or interfaces such as a TCP/IP adapter cards, wireless interface cards, or other wired or wireless communication links. Communication networks can comprise, for example, copper wires, optical fibers, wireless transmission, routers, load balancers, firewalls, switches, gateway computers, edge servers, and/or other network hardware which may be part of, or connect to, nodes of the communication networks including devices, host systems, terminals or other network computer systems. Software and data used to practice embodiments of the present disclosure can be downloaded to the computer systems operating in a network environment through communications unit 111 (e.g., via the Internet, a local area network, or other wide area networks). From communications unit 111, the software and the data of program(s) 114 can be loaded into persistent storage 116.

One or more I/O interfaces 115 may allow for input and output of data with other devices that may be connected to computing system 100. For example, I/O interface 115 can provide a connection to one or more external devices 117 such as one or more smart devices, IoT devices, recording systems such as camera systems or sensor device(s), input devices such as a keyboard, computer mouse, touch screen, virtual keyboard, touchpad, pointing device, or other human interface devices. External devices 117 can also include portable computer-readable storage media such as, for example, thumb drives, portable optical or magnetic disks, and memory cards. I/O interface 115 may connect to human-readable display 118. Human-readable display 118 provides a mechanism to display data to a user and can be, for example, computer monitors or screens. Human-readable display 118 can also be an incorporated display and may function as a touch screen, such as a built-in display of a tablet computer.

Dynamic High-Availability Computer System and Architecture

Referring to the drawings, FIGS. 2A-6 depict an approach that can be executed using one or more computing systems 100 operating within a computing environment 200, 260, 300, 360, 400, 460, 500 to implement systems, methods, and computer program products for dynamically managing HA computing environments 201, 301, 401. Embodiments of computing environments 200, 260, 300, 360, 400, 460, 500 (which can comprise one or more HA computing environments 201, 301, 401) may include one or more interconnected computing systems 100. The computing systems 100 integrated into the computing environments 200, 260, 300, 360, 400, 460, 500 may incorporate one or more elements depicted in the computing system 100 shown in FIG. 1, and described above, including (but is not limited to) the integration of one or more processor(s) 103, program(s) 114, memory 105, persistent storage 106, cache 107, communications unit 111, input/output (I/O) interface(s) 115, external device(s) 117 and human-readable display(s) 118.

As shown in FIG. 2A-4B, computing environments 200, 260, 300, 360, 400, 460, may be configured to include one or more client devices 210a-210n (hereinafter referred to generally as "client device 210" or "client devices 210") connecting to a HA computing environment 201, 301, 401 over a network 250. The client devices 210 may be computing systems 100, a piece of computer hardware and/or software that may access one or more computer systems 100 and/or servers of the HA computing environment 201, 301, 401 by way of network 250. Client devices 210 may be computing systems 100 or a program 114, wherein, as part of the computing system 100 or program 114 may rely on sending requests to another program, application, service, computer hardware and/or software made available by a server of the HA computing environment 201, 301, 401. For example, embodiments of the HA computing environments 201, 301, 401 may host nodes operating as one or more servers being accessed by the client devices 210, including one or more web servers, enterprise servers, email servers, application servers, file servers, etc.

Embodiments of network 250 may be constructed using wired, wireless or fiber optic connections and may facilitate the flow of connection requests, incoming connections and other types of network traffic between the client devices 219 and the HA computing environments 201, 301, 401. The network 250 may facilitate communication and resource sharing among the computing systems 100 of the HA computing environment 201, 301, 401, client devices 210, and other network accessible systems connected to the network 250. Examples of network 250 may include a local area network (LAN), home area network (HAN), wide area network (WAN), back bone networks (BBN), peer to peer networks (P2P), campus networks, enterprise networks, the Internet, cloud computing networks and any other network known by a person skilled in the art.

Cloud computing networks are a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. A cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment 500 is service-oriented with a focus on statelessness, low coupling, modularity, and semantic interoperability. At the heart of cloud computing is an infrastructure that includes a network 250 of interconnected nodes 510.

Figure 5:
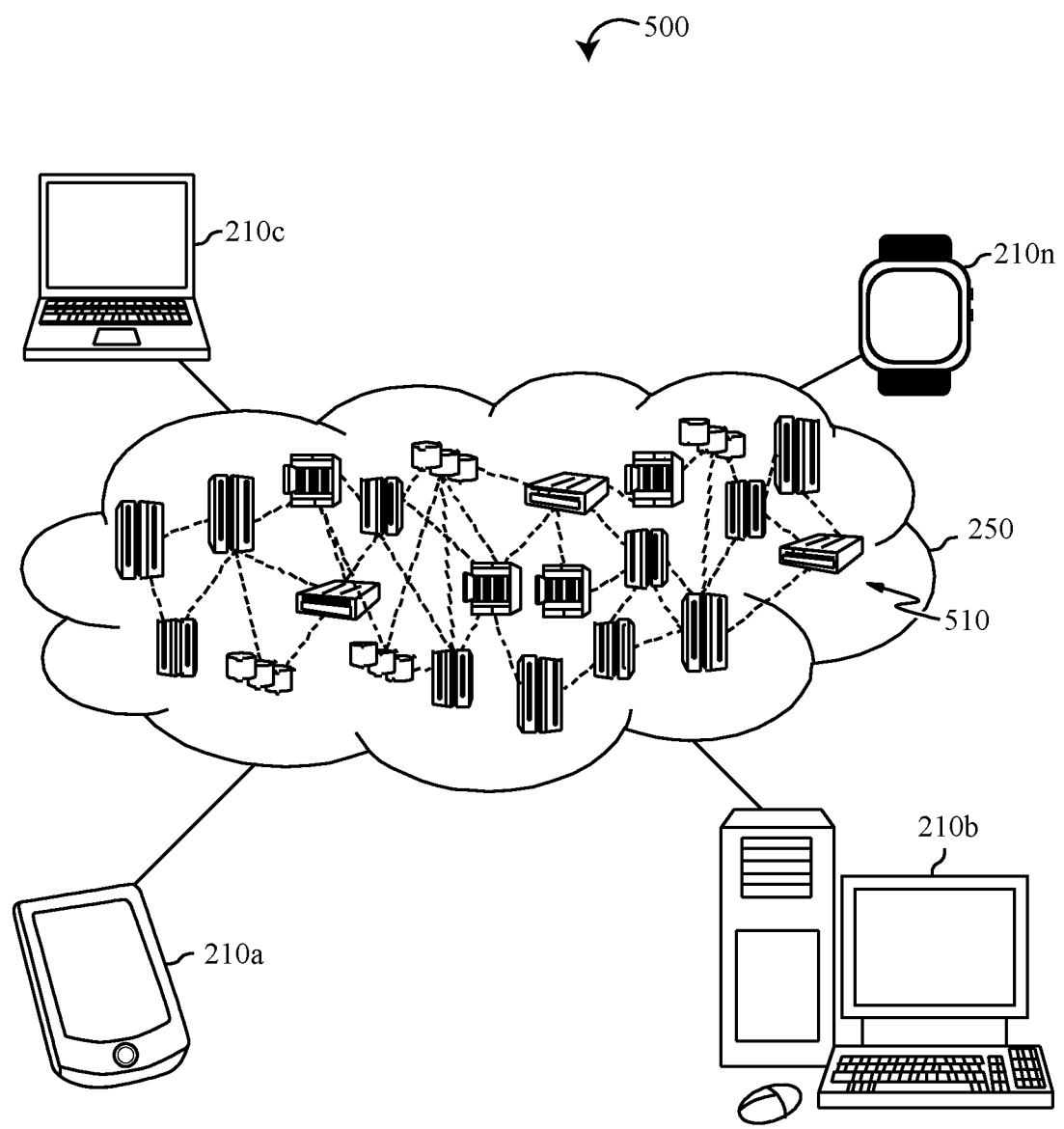
FIG. 5 depicts an embodiment of a cloud computing environment within which embodiments described herein may be implemented in accordance with the present disclosure.

Referring to the drawings, FIG. 5 is an illustrative example of a cloud computing environment 500. As shown, cloud computing environment 500 includes one or more cloud computing nodes 510 with which client devices 210 operated by the cloud consumers, may communicate with the computing nodes 510 of the cloud computing environment 500. For example, client devices 210a, 210b, 210c . . . 210n as illustrated in FIG. 5. Nodes 510 of the cloud computing environment 500 may communicate with one another and may be grouped (not shown) physically or virtually, in one or more networks, such as Private, Community, Public, or Hybrid clouds as described hereinabove, or a combination thereof. This may allow the cloud computing environment 500 to offer infrastructure, platforms, and/or software as services for which a cloud consumer does not need to maintain resources on a client device 210. It is understood that the types of client devices 210 connected to the cloud computing environment 500, are intended to be illustrative only and that computing nodes 510 of the cloud computing environment 500 can communicate with any type of computerized device over any type of network and/or network addressable connection (e.g., using a web browser).

Figure 6:
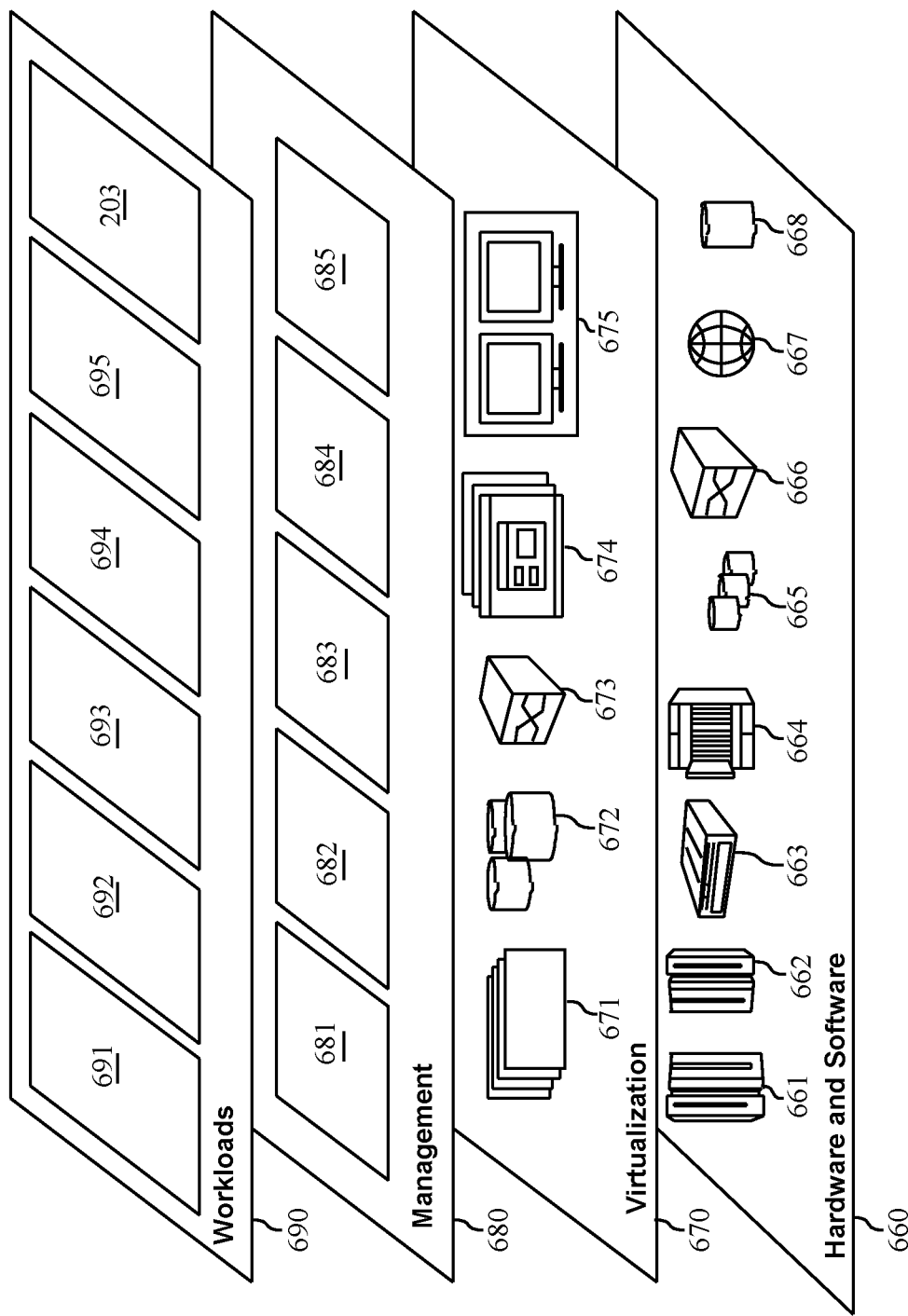
FIG. 6 depicts an embodiment of abstraction model layers of a cloud computing environment in accordance with the present disclosure.

Referring now to FIG. 6, a set of functional abstraction layers provided by cloud computing environment 500 is shown. It should be understood in advance that the components, layers, and functions shown in FIG. 6 are intended to be illustrative only and embodiments of the invention are not limited thereto. As depicted, the following layers and corresponding functions are provided:

Hardware and software layer 660 includes hardware and software components. Examples of hardware components include mainframes 661; RISC (Reduced Instruction Set Computer) architecture-based servers 662; servers 663; blade servers 664; storage devices 665; and networks and networking components 666. In some embodiments, software components include network application server software 667 and database software 668.

Virtualization layer 670 provides an abstraction layer from which the following examples of virtual entities may be provided: virtual servers 671; virtual storage 672; virtual networks 673, including virtual private networks; virtual applications and operating systems 674; and virtual clients 675.

In one example, management layer 680 may provide the functions described below. Resource provisioning 681 provides dynamic procurement of computing resources and other resources that are utilized to perform tasks within the cloud computing environment 500. Metering and pricing 682 provide cost tracking as resources are utilized within the cloud computing environment 500, and billing or invoicing for consumption of these resources. In one example, these resources can include application software licenses. Security provides identity verification for cloud consumers and tasks, as well as protection for data and other resources. User portal 683 provides access to the cloud computing environment 500 for consumers and system administrators. Service level management 684 provides cloud computing resource allocation and management such that required service levels are met. Service Level Agreement (SLA) planning and fulfillment 685 provide pre-arrangement for, and procurement of, cloud computing resources for which a future requirement is anticipated in accordance with an SLA.

Workloads layer 690 provides examples of functionality for which the cloud computing environment may be utilized. Examples of workloads and functions which may be provided from this layer include mapping and navigation 691, software development and lifecycle management 692, virtual classroom education delivery 693, data analytics processing 694, transaction processing 695, and controller user interface (UI) 203 allowing administrators to designate HA controllers 211, and/or a lead HA controller 213 in one or more primary, secondary, tertiary, etc. nodes, application components, agents, managed clusters, etc. and moreover may promote said nodes, application components, agents, managed clusters into candidates for receiving installation of a controller plugins in response to one or more HA controllers 211 failing.

Figure 2A:
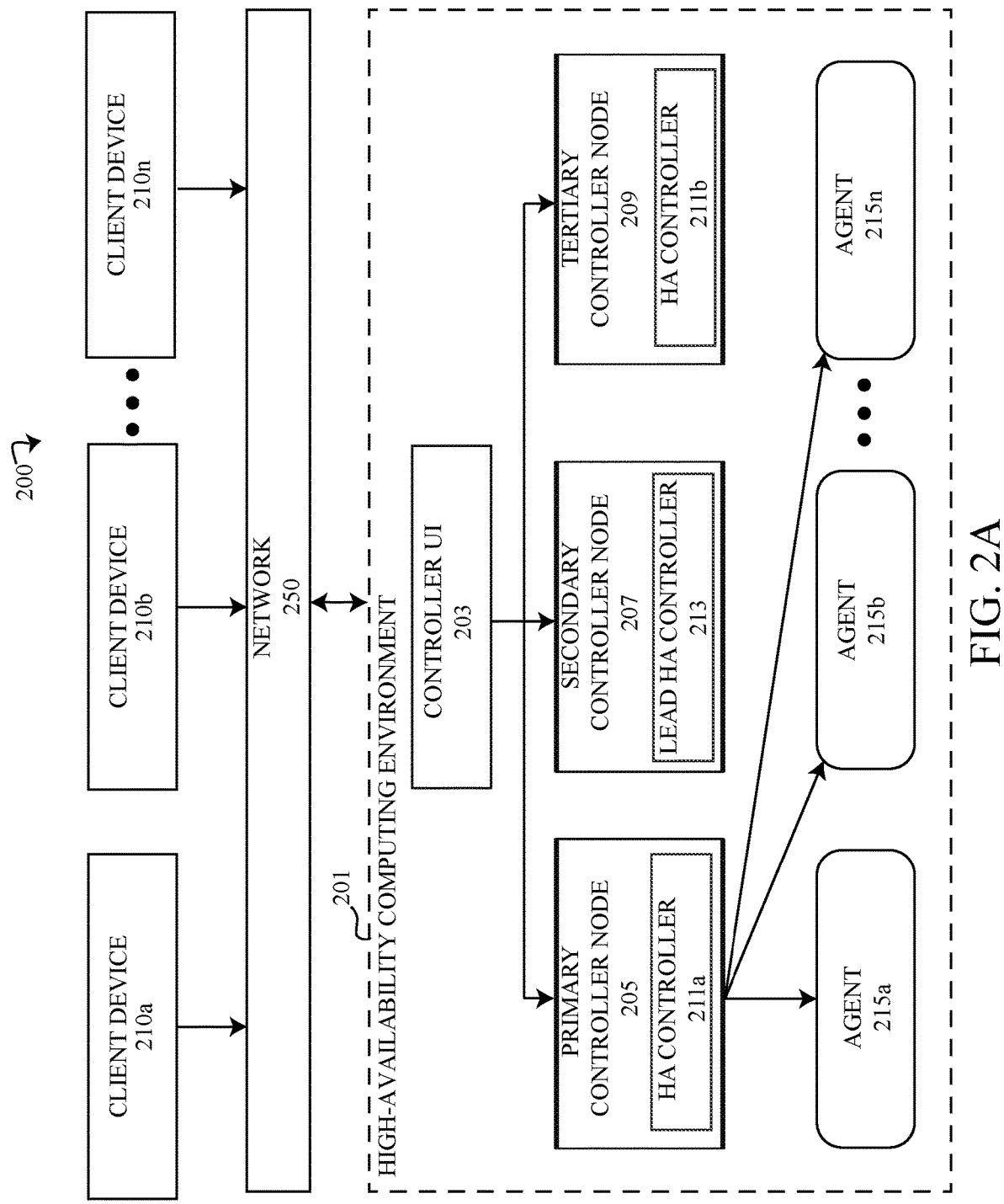
FIG. 2A depicts a block diagram of an embodiment of computing environment (single cluster) in accordance with the present disclosure in a first configuration.

Referring to the drawings, FIG. 2A depicts an embodiment of a computing environment 200 that includes a HA computing environment 201 comprising a plurality of controller nodes 205, 207, 209, each comprising an HA controller 211a, 211b and/or a lead HA controller 213; a plurality of agent nodes 215a, 215b . . . 215n (referred to generally herein as "agent 215" or "agents 215"); and a controller UI 203. A controller node 205, 207, 209 may refer to nodes of the network which may comprise the HA computing environment 201 and one or more controller nodes 205, 207, 209 may be installed with the HA controller 211 plugin and/or designated by a system administrator or authorized user via the controller UI 203 to be a lead HA controller 213. Embodiments of the controller nodes 205, 207, 209 may be connection points, redistribution points and/or communication endpoints of a computing network 250. The controller nodes 205, 207, 209 may be any type of computing system 100 described above and may be a physical computing system, virtualized systems, containerized systems, and clusters thereof. Controller nodes 205, 207, 209 may be enabled by being programmed to recognize, process and forward transmissions to other nodes of the HA computing environment 201. For example, controller nodes 205, 207, 209 can control the flow of network traffic, accept incoming requests and connections and direct the flow of the network traffic, requests and connections to the appropriate nodes of the network. As shown in FIG. 2A, the flow of network traffic can be directed from the client devices 210 to an active controller node of the HA computing environment 201 (such as primary controller node 205), which in turn may direct the network traffic to one or more agents 215 of the HA computing environment 201.

Agents 215 may be a piece of software or service that may function or operate on behalf of a user or another program. Agents 215 may work continuously and/or autonomously within the HA computing environment 201 and may learn from experiences while functioning within a particular computing environment for an extended period of time. Embodiments of agents 215 can perform automated or repetitive tasks, such as information gathering or processing tasks, which may be performed in the background. Agents 215 can be invoked by users and/or the HA controller 211 to perform a particular task; may be placed into a "wait" status on a host computing system; may run a particular status on a host upon particular starting conditions; and/or may invoke other tasks on the host, including communications, monitoring, data mining, retrieving network information, etc.

In some embodiments of a HA computing environment 201, controller nodes 205, 207, 209 may be selectively activated to control network traffic in a particular order. For example, as shown in FIG. 2A, there is a primary controller node 205, a secondary controller node 207 and a tertiary controller node 209. While only three controller nodes 205, 207, 209 are shown in this example, any number of controller nodes may be designated within the HA computing environment 201 at any given time and such designated number of simultaneously provisioned controller nodes 205, 207, 209 may be based on one or more policies of the HA computing environment 201, the computing network 250, service providers, and/or owners of a cloud network. As shown in FIG. 2A, the primary controller node 205 can be actively set to control the flow of network traffic and communication with the one or more agents 215, and primary controller node 205 fulfills the requests, connections, etc., received from client devices 210. Moreover, while the primary controller node 205 comprising the HA controller 211a is active and controlling the flow of network traffic, embodiments of the secondary controller node 207 and tertiary controller node 209 may be performing one or more background tasks. For example, secondary controller node 207 and tertiary controller node may be synchronizing data and/or configuration settings with the primary controller node's HA controller 211a and/or synchronizing with the lead HA controller 213, either periodically or continuously, until either the secondary controller node 207 and/or tertiary controller node 209 is selected to takeover for the primary controller node 205. For example, in the event that primary controller node 205 undergoes a failure and cannot perform one or more tasks for controlling incoming network traffic, one of the backup controller nodes 207, 209 installed with an HA controller 211 or a lead HA controller 213 may takeover as the active controller node and fulfill the tasks and/or functions of the failed primary controller node 205.

Embodiments of the HA computing environment 201 may include a controller user interface (UI) 203. The controller UI 203 may provide system administrators and other authorized users a means for controlling and configuring one or more elements of the HA computing environment 201. For example, using the controller UI to elect one or more nodes to install the lead HA controller 213 and/or select one or more nodes for initially installing and/or configuring one or more HA controllers 211. Using embodiments of the controller UI 203, a user or administrator may install a controller node 205, 207, 209 with the components of the lead HA controller 213, including one or more settings, configurations, policies and programmed logic for electing and promoting additional arbitrary systems of the HA computing environment 201 to an HA controller 211 or controller candidate. Once created, a node, hub cluster manager, application component 405 or other arbitrary system within the HA computing environment 201, 301, 401 comprising a lead HA controller 213 can configure any other arbitrary system within an HA computing environment 201, 301, 401 into an HA controller 211 or controller candidate. For instance, in the event that one or more active HA controllers 211 fail. As shown in the exemplary embodiment of FIG. 2A, the secondary controller node 207 is elected to be the lead HA controller 213 and is configured accordingly. In some embodiments it may be beneficial to have the arbitrary system of the HA computing environment 201 configured as the lead HA controller 213 to not be the active controller, as shown in FIG. 2A, in case the active HA controller 211 experiences a failure, the lead HA controller 213 remains available and can promote other arbitrary systems of the HA computing environment 201 to controller candidates and install the HA controller 211 plugin.

Figure 2B:
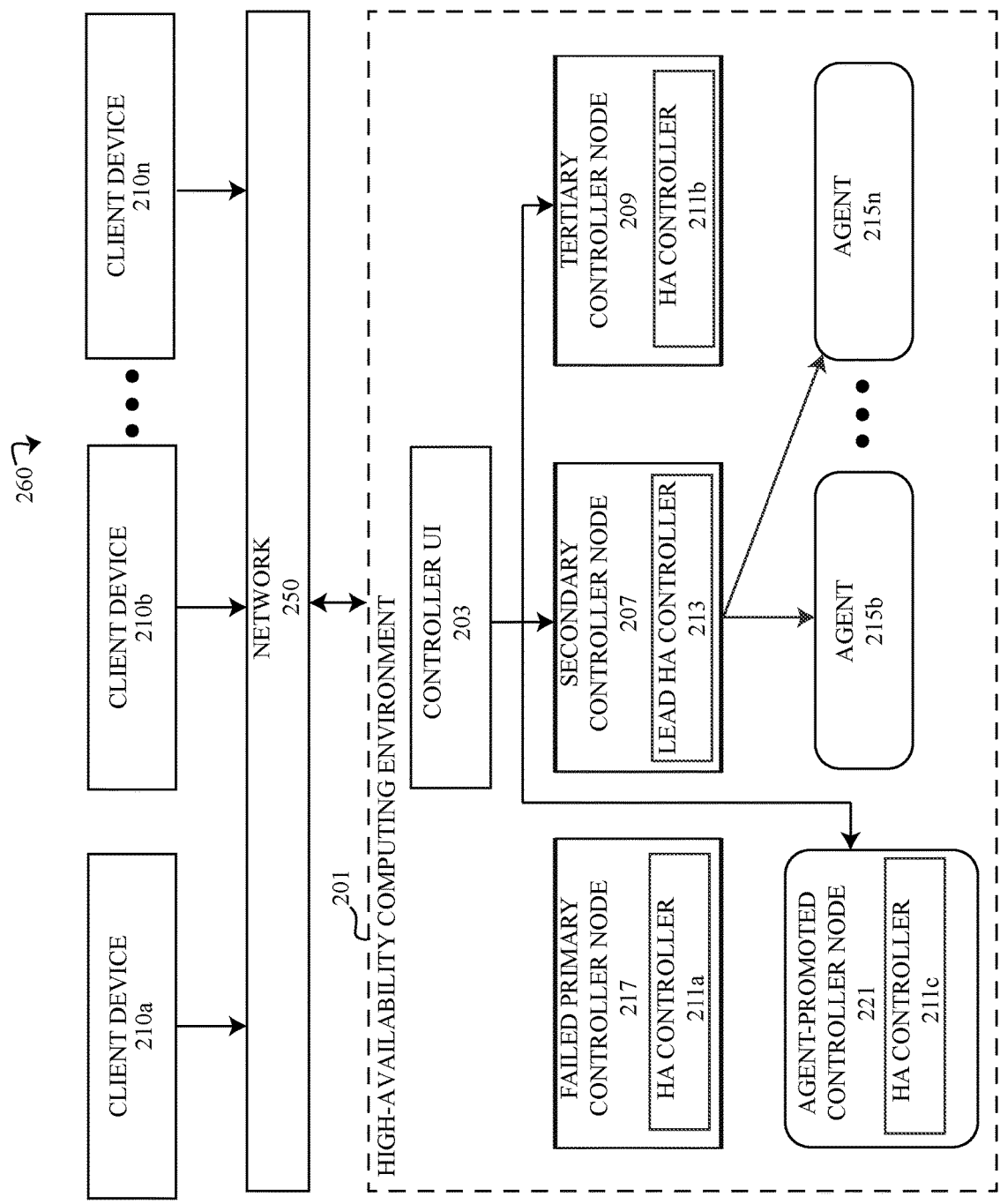
FIG. 2B depicts a block diagram of the embodiment of the computing environment (single cluster) of FIG. 2A in a second configuration.

FIG. 2B depicts the exemplary embodiment of FIG. 2A following a failure of one or more active nodes operating as an HA controller 211. As shown, the primary controller node 205 has failed and has become a failed primary controller node 217. The embodiment of the failed primary controller node 217 is no longer in communication with the agents 215a-215n. In response to the failure of the primary controller node 205, the secondary controller node 207 has become the active controller for the HA computing environment 201 and is actively in communication with agents 215b-215n. Moreover, in the depicted embodiment, lead HA controller 213 creates a new controller for the HA computing environment from agent 215a. As shown, the lead HA controller 213 selects agent 215a and promotes agent 215a into an agent-promoted controller node 221, to ensure that a dedicated number of HA controllers 211 are available for use within the HA computing environment 201 and in accordance with the HA computing environment's policies.

During the promotion process of an arbitrary system to an HA controller 211, the lead HA controller 213 may drain off the workloads from the selected system before promotion thereof. In the example shown in FIG. 2B, the lead HA controller 213 drains the workload from agent 215a before promoting the agent 215a to agent-promoted controller node 221. Embodiments of the lead HA controller 213 installs the HA controller plugin onto agent-promoted controller node 221, including one or more components for the installed HA controller 211c. HA controller 211c may synchronize with the data of the lead HA controller 213 and/or other HA controllers 211, within the HA computing environment 201, including performing data backup and data migration functions. Moreover, the newly created HA controller 211c may synchronize configuration settings to match the other HA controllers 211 within the HA computing environment 201 and/or the lead HA controller 213, as well as create signed digital certificates identifying the newly created HA controller 211c as a legitimate controller for the HA computing environment 201.

Figure 3A:
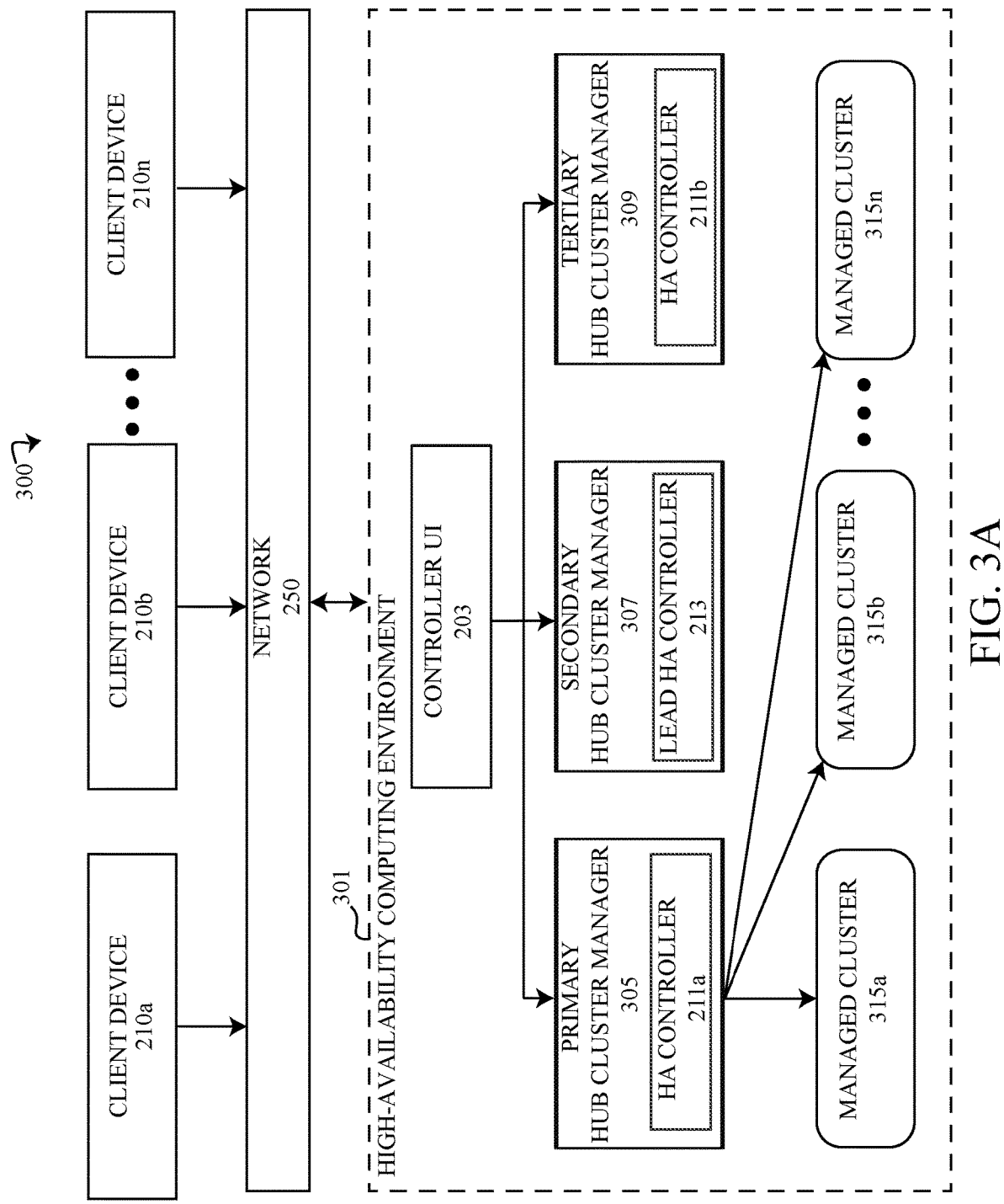
FIG. 3A depicts a block diagram of an alternative embodiment of a computing environment (multiple clusters) in accordance with the present disclosure in a first configuration.

FIG. 3A depicts an alternative embodiment of HA computing environment 201, shown as HA computing environment 301, comprising a different composition of arbitrary systems operating within the HA computing environment 301. Whereas HA computing environment 201 may be described as a single cluster high-availability environment, HA computing environment 301 depicted in FIG. 3A-3B demonstrates configuring HA controllers 211 and/or lead HA controller 213 for use in a multi-cluster and/or multi-cloud environment. As shown in FIG. 3A, the HA computing environment 301 may comprise a plurality of arbitrary systems, including (but not limited to) controller UI 203, hub cluster managers 305, 307, 309 and managed clusters 315a, 315b . . . 315n (referred herein generally as "managed cluster 315" or "managed clusters 315").

Similar to the controller nodes 205, 207, 209 of FIG. 2A-2B, the plurality of hub cluster managers 305, 307, 309 may be configured as controllers for the HA computing environment 301. For example, a primary hub cluster manager 305 may be the active controller comprising HA controller 211a installed thereon, while secondary hub cluster manager 307 and tertiary hub cluster manager 309 may be provisioned and ready as backup controllers, in the event that primary hub cluster manager 305 fails or is taken offline. As shown in FIG. 3A, in some embodiments, secondary hub cluster manager 307 may be elected as the lead HA controller 213 via the controller UI 203 and installed with one or more components and/or plugins capable of creating new HA controllers 211, selecting controller candidates from the available arbitrary systems of the HA computing environment 301 and/or promoting arbitrary systems of HA computing environment 301 to controllers of the HA computing environment 301. For example, by promoting one or more managed clusters 315 to a promoted managed cluster 321 and installing HA controller 211c onto the managed cluster being promoted, as shown in FIG. 3B.

Embodiments of a hub cluster manager 305, 307, 309 may refer to a backend graphical user interface (GUI), or command-line software that may run on one or all cluster nodes. For example, the hub cluster manager 305, 307, 309 may run on different servers within the HA computing environment 301 and/or a cluster of management servers. The hub cluster manager may work together with cluster management agents, which may run on each node of the cluster to manage and configure services, a set of services and/or manage and configure a complete cluster server. Embodiments of the hub cluster manager 305, 307, 309 may be used to dispatch work being performed by one or more managed clusters 315, which may include one or more clouds.

Figure 3B:
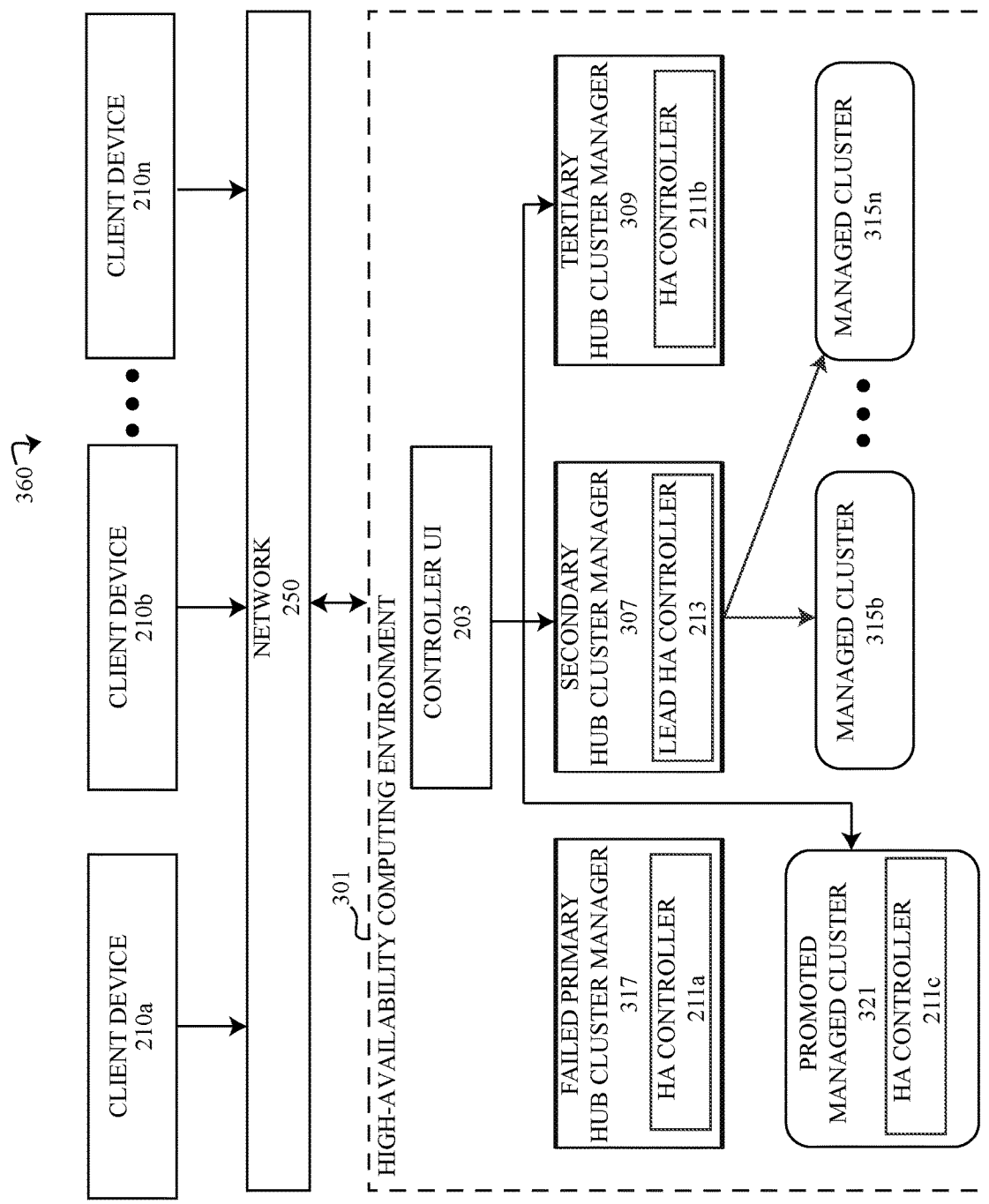
FIG. 3B depicts a block diagram of the alternative embodiment of the computing environment (multiple clusters) of FIG. 3A in a second configuration.

The exemplary embodiment of FIG. 3B depicts one or more failures by an HA controller 211a within a multi-cloud or multi-cluster HA computing environment 301 and the accompanying response by the lead HA controller 213 to ensure that enough HA controllers are available within the HA controller environment 301 despite the failure of at least one HA controller 211a. For example, to maintain the HA computing environment 301 in compliance with one or more policies governing the HA computing environment and the requirements thereof. As depicted, the primary hub cluster manager 305, which was previously active and managing network traffic in FIG. 3A, has undergone a failure or is offline (i.e. for scheduled maintenance, upgrade, removal, etc.), and is described in FIG. 3B as failed primary hub cluster manager 317. In response to the failed or offline status of the primary hub cluster manager 305, secondary hub cluster manager 307, elected as the lead HA controller 213, becomes the active controller for the HA computing environment 301 and continues to control the flow of network traffic from the client devices 210 to the managed clusters 315. In alternative embodiments, instead of the secondary hub cluster manager 307 becoming the active controller of the network traffic, tertiary hub cluster manager 309 or any other arbitrary system within the HA computing environment installed with the HA controller 211 may become the active controller for the HA computing environment 301.

In response to the primary hub cluster manager 305 becoming a failed primary hub cluster manager 317, the lead HA controller of the secondary hub cluster manager 307 may create one or more new HA controllers 211 within the HA computing environment by promoting one or more arbitrary systems and installing an HA controller plugin onto the selected arbitrary system being promoted. For example, in FIG. 3B, managed cluster 315*a* is selected as a HA controller candidate and is promoted to promoted managed cluster 321. Lead HA controller 213 installs the HA controller 211*c* onto the promoted managed cluster 321 via the HA controller plugin, including the installation of HA controller components, and cluster manager components. Moreover, once the HA controller plugin is installed onto the promoted managed cluster 321, the promoted managed cluster 321 may synchronize data and settings with the remaining HA controllers 211*b* and/or lead HA controller 213, backup data and migrate data to or from the HA controller 211*c*.

Figure 4A:
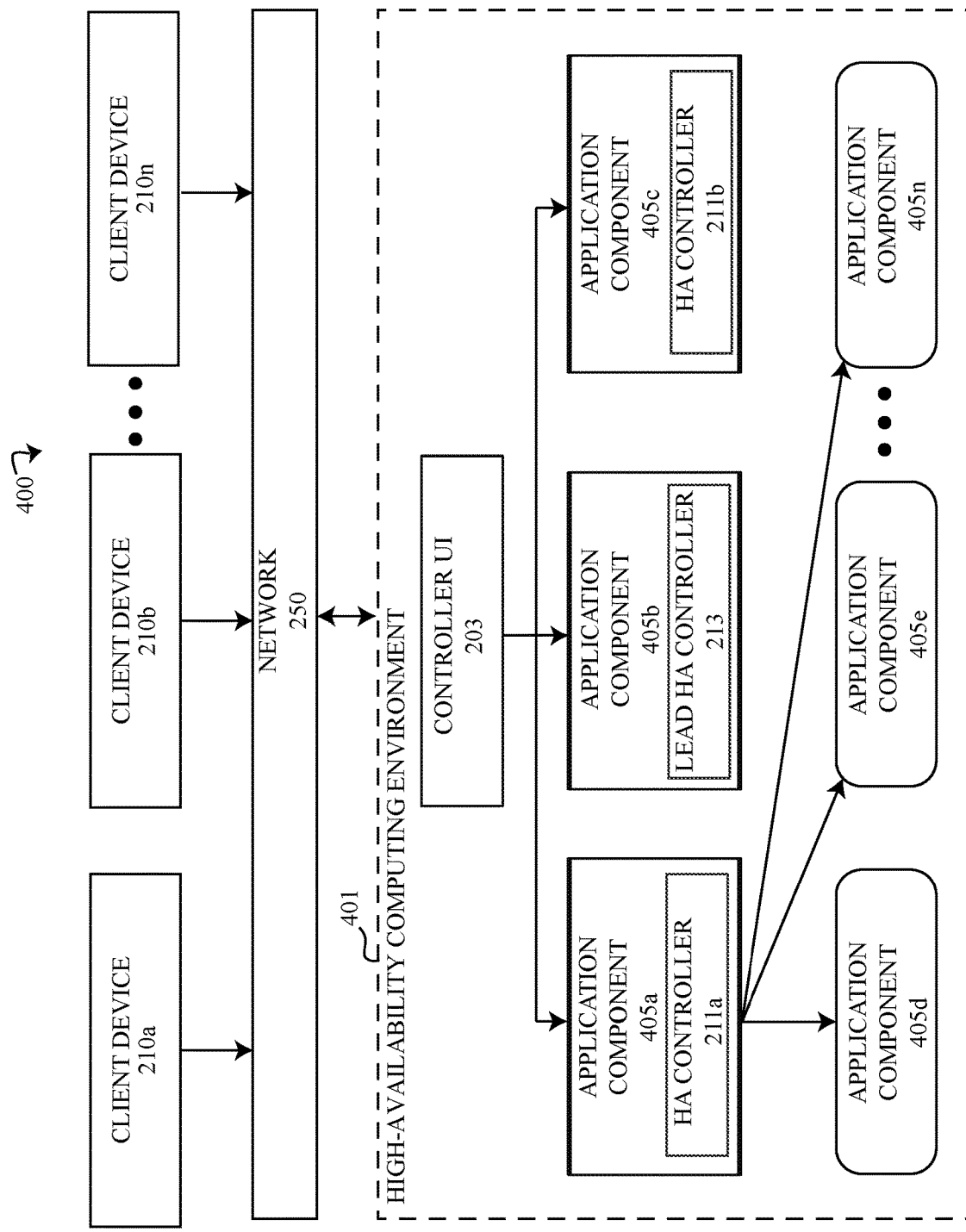
FIG. 4A depicts a block diagram of a second alternative embodiment of a computing environment (arbitrary application) in accordance with the present disclosure in a first configuration.

FIG. 4A depicts a second alternative embodiment of HA computing environment, shown herein as HA computing environment 401. As presented in FIG. 4A, HA computing environment 401 maintains a high availability system architecture for one or more applications and/or application components being accessed by the one or more client devices 210, as shown. A lead HA controller 213 is elected and lead HA controller components are installed onto the application component 405*b* via the controller UI 203. Additional HA controllers 211*a*, 211*b* are installed onto application component 405*a* and application component 405*c* respectively. Moreover, in this exemplary embodiment, application component 405*a* comprising HA controller 211*a* is shown functioning as the active controller for the HA computing environment 401 controlling the flow of network traffic between the client devices 210 and application components 405*d*-405*n*.

Figure 4B:
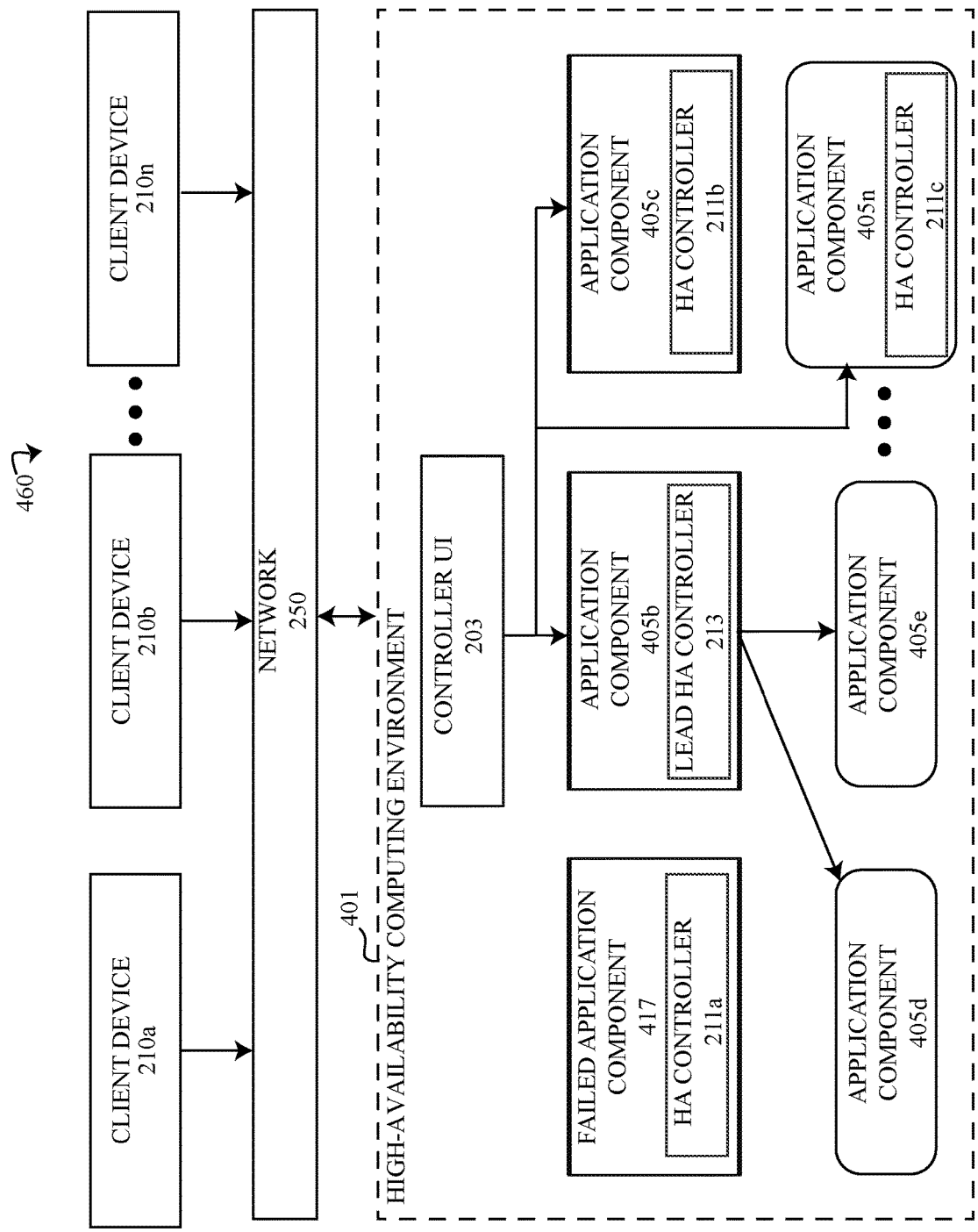
FIG. 4B depicts a block diagram of the second alternative embodiment of the computing environment (arbitrary application) of FIG. 4A in a second configuration.

FIG. 4B depicts the HA computing environment 401 of FIG. 4A in a second configuration following a failure or offline status of the primary HA controller (HA controller 211*a* in this example) installed onto application component 405*a*. Similar to the HA computing environments 201, 301, upon the failure of offline status of the failed application component 417 operating as an HA controller 211*a*, the lead HA controller 213 of application component 405*b* may select another application component 405 installed with HA controller components and/or the lead HA controller 213 to operate as the active controller for the HA computing environment. As shown in FIG. 4B, in response to the failure of failed application component 417, application component 405*b* is activated as the active controller for the HA computing environment 401. Application component 405*b* operating as the active controller may control and direct the flow of network traffic between the client devices 210 to one or more application components 405*d*-405*n*, including incoming application component requests, connections, etc.

Embodiments of application component 405*b*, operating as the lead HA controller 213, may further create additional HA controllers 211 by promoting any of the one or more application components 405*d*-405*n* of the HA computing environment 401 to be an HA controller. As shown in FIG. 4B, upon the failure of failed application component 417, application component 405*b* may takeover as the active controller for the HA computing environment 401. Alternatively, in other embodiments, application component 405*c* may be assigned as the active controller. Lead HA controller 213 may identify and select one or more application components 405*d*-405*n* and install the HA controller plugin onto the application component 405, promoting the selected application component candidate to an HA controller. 211. In the exemplary embodiment of FIG. 4B, application component 405*n* is selected to be promoted to a controller for the HA computing environment. Lead HA controller 213 installs the HA controller plugin onto application component 405*n*, including installation of all of the components for the HA controller 211*c*. Upon installation of HA controller 211*c*, application component 405*n* may synchronize data, configurations and settings of the HA controller 211*c* with lead HA controller 213 and/or HA controller 211*b*. During synchronization of the data, configurations and settings, the data, migration and settings being synchronize may migrate from one or more HA controllers 211 and/or lead HA controller 213 and/or be backed up by the HA controller 211*c*.

Method for Dynamically Configuring a High-Availability Computing Environment

Figure 7:
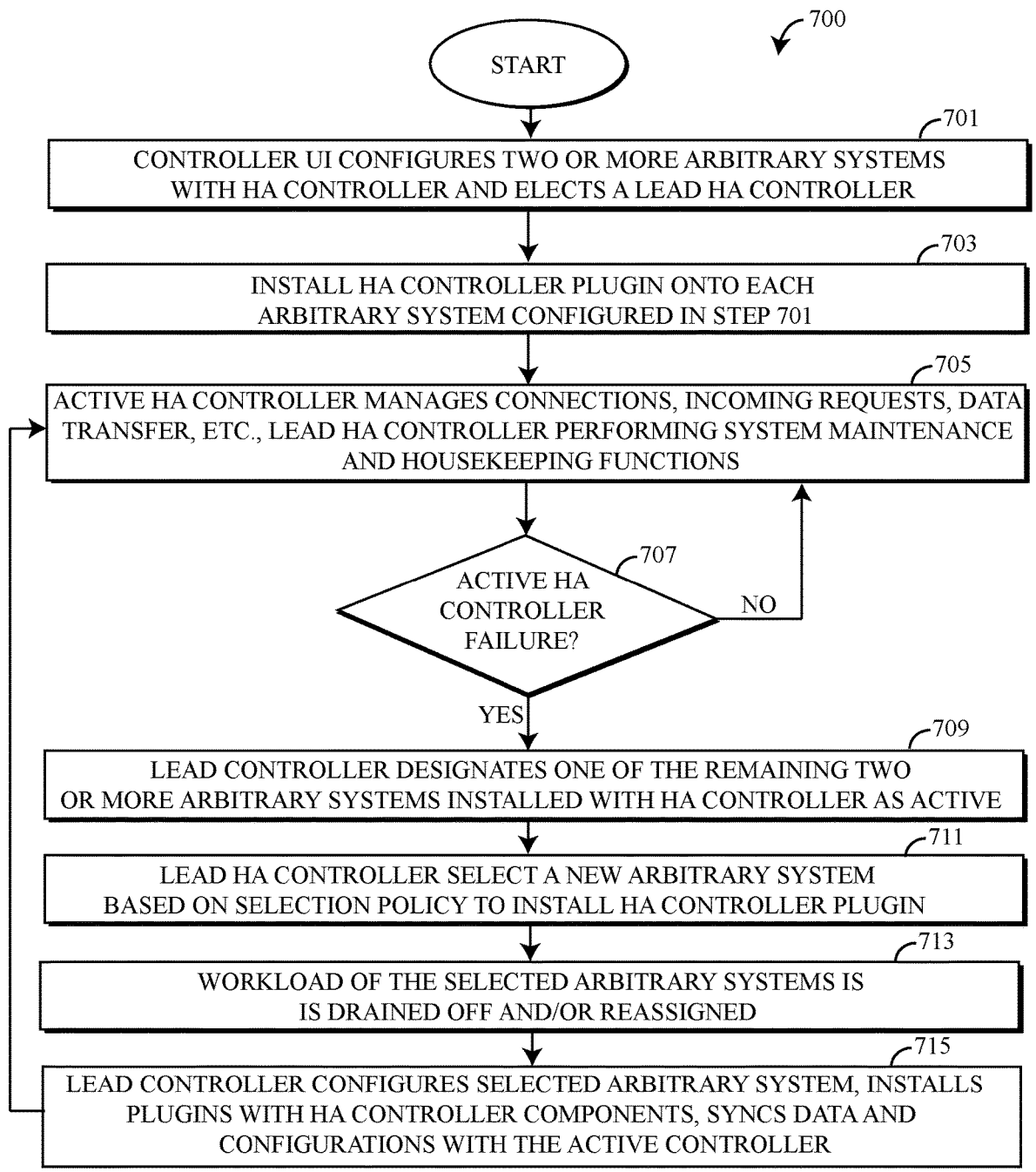
FIG. 7 illustrates a flowchart describing an embodiment of an algorithm implementing a method for dynamically managing a high-availability computing environment using a plugin model, in accordance with the present disclosure.

The drawings of FIG. 7 represent an embodiment of an algorithm 700 performing a computer-implemented method for dynamically configuring an HA computing environment 201, 301, 401, consistent with the embodiments of FIG. 2A-6 and as described herein. The algorithm 700, may use one or more computer systems, defined generically by computing system 100 of FIG. 1, and more specifically by the embodiments of the computing environments 200, 260, 300, 360, 400, 460, 500 depicted in FIGS. 2*a*-6, as described herein. A person skilled in the art should recognize that the steps of the algorithm 700 described in FIG. 7 may be performed in a different order than presented. The algorithm 700 may not necessarily require all the steps described herein to be performed. Rather, some embodiments of algorithm 700 may alter the methods by performing a subset of steps using one or more of the steps discussed below.

Embodiments of the algorithm 700 may begin at step 701. In step 701, a user or system administrator accessing controller UI 203 may perform an initial configuration of the arbitrary systems within the HA computing environment, and more specifically, may configure a lead HA controller 213. Embodiments of the controller UI 203 may elect one or more arbitrary systems as a lead HA controller. In step 703, lead HA controller components and logic may be installed onto the system elected as lead HA controller. Moreover, in some embodiments, users may manually configure one or more arbitrary systems of the HA computing environment as HA controllers 211, by further selecting arbitrary systems as HA controllers 211 and installing the HA controller plugin onto selected systems. In some embodiments, users configuring the HA computing environment may select the active HA controller from the arbitrary systems configured as HA controllers 211 and/or the lead HA controller 213. In other embodiments, a user may elect the lead HA controller 213 in step 701 and install the lead controller components onto the elected systems in step 703. Once configured, the lead HA controller 213 may automatically create additional HA controllers 211 on additional arbitrary systems of the HA computing environment in accordance with the policies of the HA computing environment, by installing the HA controller plugin onto arbitrary systems selected by the lead HA controller 213.

During step 705, the active HA controller as configured and installed during steps 701 and 703 may actively manage the network traffic of the HA computing environment. The active HA controller may manage incoming connections, requests, data transfers, etc. The backup HA controllers may continue to perform one or more functions or tasks in the background. For example, synchronizing data, configurations and settings with the active HA controller and/or the lead HA controller 213 and/or performing backup operations. In some embodiments, the lead HA controller 213 may perform additional operations, including system maintenance, housekeeping functions, and data collection about the health and status of the HA computing environment.

During step 707, a determination is performed by the lead HA controller 213 whether or not the active controller has failed or is still operational. If, during step 707 the determination is made that the active HA controller is still operational, the algorithm 700 may return to step 705, wherein the active HA controller continues to manage the network traffic of the HA computing environment and the backup HA controllers continue to perform background functions and/or tasks as described above. Conversely, if the lead HA controller detects that the active HA controller has failed or has been taken offline (i.e. for scheduled maintenance, updates, upgrades, replacement, etc.), the algorithm 700 may proceed to step 709. During step 709, the lead HA controller 213 may designate one or more arbitrary systems of the HA computing environment previously installed with the HA controller plugin and configured as an HA controller 211 and/or designate itself, the lead HA controller 213, to operate as the active HA controller for the HA computing environment. Upon automatically activated the selected HA controller 211 or lead controller, without intervention by the user, the flow of network traffic may resume from one or more client devices 210 to one or more arbitrary systems of the HA computing environment.

In step 711 of algorithm 700, the lead HA controller 213 may selectively create one or more new HA controllers 211 by promoting one or more arbitrary systems of the HA computing environment. In some embodiments, the lead HA controller 213 may analyze existing policies for the HA computing environment and determine whether or not one or more policies governing the architecture of the HA computing environment requires additional HA controllers 211 to be created. If policies and requirements governing the HA computing environment are satisfied based on the current configuration of HA controllers 211 and lead HA controllers 213, embodiments of the lead HA controller 213 may not create any additional HA controllers 211 and the algorithm may return to step 705. However, if upon analyzing the existing policies and requirements of the HA computing environment, the lead HA controller 213 determines that additional HA controllers 211 are needed to meet the specifications of the policies and requirements, the lead HA controller 213 may selectively target one or more arbitrary systems within the HA computing environment, such as an existing node, agent 215, managed cluster 315, application component, etc., as candidates to be promoted to an HA controller 211.

In step 713 of the algorithm 700, the lead HA controller 213 drains off the workload from the arbitrary systems selected as candidates in step 711 to be promoted to an HA controller 211 and/or reassigns the workloads being performed by the candidates selected for promotion in step 711 to one or more unselected arbitrary systems within the HA computing environment. Once the workload has been drained or reassigned from the arbitrary system selected for promotion to an HA controller 211, in step 715 the lead HA controller 213 may configure the arbitrary system by installing the HA controller plugin onto the selected arbitrary system, including the installation of one or more controller components, cluster manager components, application components and/or signed digital certificates. The arbitrary system installed with the HA controller 211 may proceed with synchronizing data, configurations and settings of the HA controller with other HA controllers of the HA computing environment and/or the lead HA controller 213 as well as perform backups of the data, settings and configurations. Upon conclusion of the configuration and installation of the HA controller plugin onto the arbitrary system being promoted, the algorithm 700 may return to step 705.

The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method for dynamically configuring a high-availability computing environment comprising:
    designating, by a processor, a first arbitrary system of a computing network as a primary controller and a second arbitrary system of the computing network as a secondary controller;
    installing, by the processor, on the primary controller and the secondary controller, a plugin comprising a high-availability (HA) controller;
    routing, by the processor, incoming network traffic from client devices of the computing network through the primary controller;
    detecting, by the processor, a failure of the primary controller;
    re-routing, by the processor, the incoming network traffic through the secondary controller;
    in response to the failure of the primary controller, selecting, by the processor, one or more arbitrary systems of the computing network for promotion to a controller candidate;
    promoting, by the processor, the one or more arbitrary systems selected to the controller candidate; and
    installing, by the processor, the plugin comprising the HA controller onto the controller candidate.

2. The computer-implemented method of claim 1, wherein the first arbitrary system designated as the primary controller and the second arbitrary system designated as the secondary controller are selected from the group consisting of a network node, a hub cluster and a core application component.

3. The computer-implemented method of claim 1, wherein the one or more arbitrary systems selected to be promoted to the controller candidate is selected from the group consisting of an agent node, a managed cluster and a core application component.

4. The computer-implemented method of claim 1, further comprising:
    electing, by the processor, the secondary controller as a lead HA controller, wherein the lead HA controller performs tasks comprising:
        selecting the controller candidate from the one or more arbitrary systems for the promotion;

promoting the one or more arbitrary systems to the controller candidate;

installing the selected controller candidate with the plugin;

installing HA controller components onto the selected controller candidate; and synchronizing data and configurations of the HA controller of the selected controller candidates with the lead HA controller.

5. The computer-implemented method of claim 4, further comprising:

detecting, by the processor, a failure of the secondary controller; and re-routing, by the processor, the incoming network traffic through the selected controller candidate, wherein the selected controller candidate is operating as a tertiary controller for the high-availability computing environment.

6. The computer-implemented method of claim 1, wherein the one or more arbitrary systems includes nodes, clusters or core application components of the high-availability computing environment and any of the nodes, the clusters or the core application components of high-availability systems can be promoted to the controller candidate within the high-availability computing environment by installing the plugin for the HA controller.

7. The computer-implemented method of claim 1, wherein any existing controller within the high-availability computing environment can provision a new controller candidate by draining a workload off an arbitrary system within the high-availability computing environment and installing the plugin onto the arbitrary system.

8. The computer-implemented method of claim 1, wherein the high-availability computing environment is a multi-cloud environment, the first arbitrary system operating as the primary controller is a first hub cluster manager, the second arbitrary system operating as the secondary controller is a second hub cluster manager, and the one or more arbitrary systems promoted to the controller candidate is a managed cluster of the multi-cloud environment.

9. A computer system comprising:

a processor; and a computer-readable storage media coupled to the processor, wherein the computer-readable storage media contains program instructions executing a computer-implemented method for dynamically configuring a high-availability computing environment comprising:

designating, by the processor, a first arbitrary system of a computing network as a primary controller and a second arbitrary system of the computing network as a secondary controller;

installing, by the processor, on the primary controller and the secondary controller, a plugin comprising a high-availability (HA) controller;

routing, by the processor, incoming network traffic from client devices of the computing network through the primary controller;

detecting, by the processor, a failure of the primary controller;

re-routing, by the processor, the incoming network traffic through the secondary controller;

in response to the failure of the primary controller, selecting, by the processor, one or more arbitrary systems of the computing network for promotion to a controller candidate;

promoting, by the processor, the one or more arbitrary systems selected to the controller candidate; and installing, by the processor, the plugin comprising the HA controller onto the controller candidate.

10. The computer system of claim 9, wherein the first arbitrary system designated as the primary controller and the second arbitrary system designated as the secondary controller are selected from the group consisting of a network node, a hub cluster and a core application component.

11. The computer system of claim 9, wherein the one or more arbitrary systems selected to be promoted to the controller candidate is selected from the group consisting of an agent node, a managed cluster and a core application component.

12. The computer system of claim 9, wherein the program instructions further comprise:

electing, by the processor, the secondary controller as a lead HA controller, wherein the lead HA controller performs tasks comprising:

selecting the controller candidate from the one or more arbitrary systems for the promotion;

promoting the one or more arbitrary systems to the controller candidate;

installing the selected controller candidate with the plugin comprising the HA controller;

installing HA controller components onto the selected controller candidate; and synchronizing data and configurations of the HA controller of the selected controller candidate with the lead HA controller.

13. The computer system of claim 12, wherein the program instructions further comprise:

detecting, by the processor, a failure of the secondary controller; and re-routing, by the processor, the incoming network traffic through the selected controller candidate, wherein the selected controller candidate is operating as a tertiary controller for the high-availability computing environment.

14. The computer system of claim 9, wherein the one or more arbitrary systems includes nodes, clusters or core application components of the high-availability computing environment and any of the nodes, the clusters or the core application components of the high-availability systems can be promoted to the controller candidate within the high-availability computing environment by installing the plugin for the HA controller.

15. The computer system of claim 9, wherein any existing controller within the high-availability computing environment can provision a new controller candidate by draining a workload off an arbitrary system within the high-availability computing environment and installing the plugin onto the arbitrary system.

16. A computer program product comprising:

one or more computer-readable storage media having computer-readable program instructions stored on the one or more computer-readable storage media said computer-readable program instructions executes a computer-implemented method comprising:

installing on a primary controller node and a secondary controller node of a high-availability computing environment, a plugin comprising a high-availability (HA) controller;

routing incoming network traffic from client devices of a computing network through the primary controller node;

detecting a failure of the primary controller node;

re-routing the incoming network traffic through the secondary controller node;

in response to the failure of the primary controller node, selecting one or more agent nodes of the computing network for promotion to a controller node candidate;

promoting the selected one or more agent nodes to the controller node candidate, and installing the plugin comprising the HA controller onto the controller node candidate.

17. The computer program product of claim 16, wherein the computer-readable program instructions further comprise:

electing the secondary controller node as a lead HA controller, wherein the lead HA controller performs tasks comprising:

selecting the one or more agent nodes for the promotion to the controller node candidate;

promoting the one or more agent nodes to the controller node candidate;

installing the selected controller node candidate with the plugin comprising the HA controller;

installing HA controller components onto the selected controller node candidate; and synchronizing data and configurations of the HA controller of the selected controller node candidate with the lead HA controller.

18. The computer program product of claim 17, wherein the computer-readable program instructions further comprise:

detecting a failure of the secondary controller node; and re-routing, by the processor, the incoming network traffic through the selected controller node candidate, wherein the selected controller node candidate is operating as a tertiary controller node for a high-availability computing environment.

19. The computer program product of claim 16, wherein any of the one or more agent nodes can be promoted to the controller node candidate within a high-availability computing environment by installing the plugin for the HA controller onto the one or more agent nodes.

20. The computer program product of claim 16, wherein any existing controller node within a high-availability computing environment can provision a new controller node candidate by draining a workload off the one or more agent nodes within the high-availability computing environment and installing the plugin onto the one or more agent nodes.

* * * * *